United States Patent [19]
Nakayama

[11] 3,741,636
[45] June 26, 1973

[54] MOTION PICTURE PROJECTING DEVICE WHICH AUTOMATICALLY CHANGES THE PROJECTION SPEED

[75] Inventor: Yoshiaki Nakayama, Tokyo, Japan

[73] Assignee: Fuji Photo Film Co., Ltd., Minami-Ashigara-shi, Kanagawa, Japan

[22] Filed: Mar. 3, 1971

[21] Appl. No.: 120,417

[30] Foreign Application Priority Data
Mar. 3, 1970 Japan.............................. 45/18119

[52] U.S. Cl. ................................................ 352/180
[51] Int. Cl. ............................................. G03b 21/48
[58] Field of Search..................... 352/180, 181, 182

[56] References Cited
UNITED STATES PATENTS
2,349,941  5/1944  Cramwinckel..................... 352/182

Primary Examiner—John M. Horan
Attorney—Sughrue, Rothwell, Mion, Zinn & Macpeak

[57] ABSTRACT

A motion picture projecting device having a means for sensing film projecting speed signals recorded on the film strip or on a separate magnetic recording tape and including a speed control means for automatically controlling the projection speed in response to the sensed speed signals to enable a reduced length of film per unit time to be used for more efficient use of the film.

5 Claims, 5 Drawing Figures

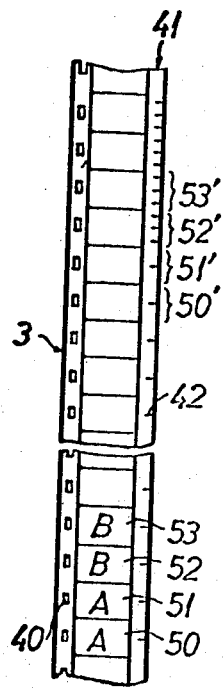
FIG. 2
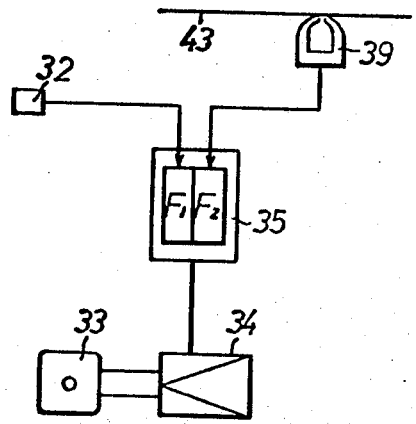
FIG. 3
FIG. 4
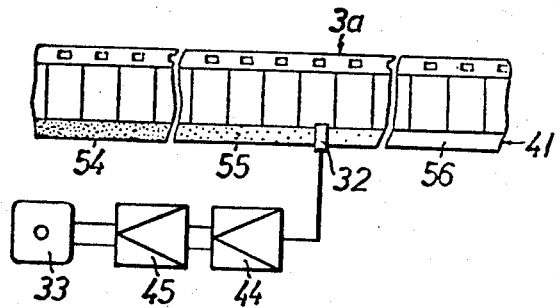
FIG. 5
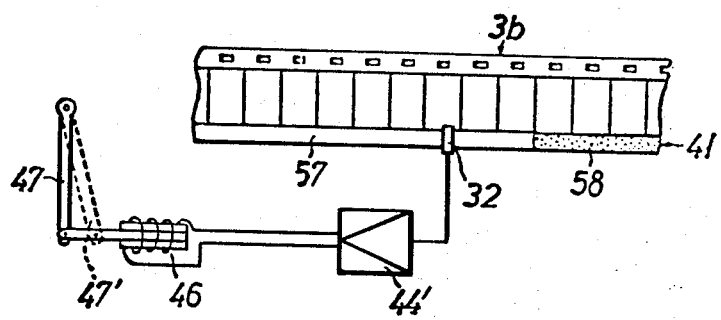

MOTION PICTURE PROJECTING DEVICE WHICH AUTOMATICALLY CHANGES THE PROJECTION SPEED

BACKGROUND OF THE INVENTION

1. Field of the Invention

The present invention relates to a motion picture projecting device which automatically controls the projection speed, and more particularly to a motion picture projecting device which controls the projection speed according to a speed signal provided on the motion picture film to be projected. The projecting device referred to in this invention should be understood in its broad term as a means for displaying motion pictures, including a projecting means used in television recording and transmission and receiving devices.

2. Prior Art

Recently, more compact types of motion projectors for 8m/m film have been required for use in the audio-visual field. In such a case, it is naturally desired that the film and softwear articles be obtained at a low cost. The most simple and efficient way to reduce the price or cost of the film is to reduce the length of the film used in a unit time. However, if the speed of feed of the film in the projector is reduced too much, it becomes impossible to make a natural motion picture projection. Therefore, it has been a practice to project the motion picture film at the speed of 24 frames/sec or 18 frames/sec.

However, it is unnecessary to project the motion picture at so fast a speed in the case of animation or special pictures of some types Six frames per second, for instance, is enough to naturally project such types of pictures.

In actual projection, there are some parts of a film which must be projected at a speed of 24 frames/sec and other parts of the same film which can be projected at a lower speed, such as six frames/sec. Even in such a case, the film is normally projected at the higher speed in the conventional projector, which is very disadvantageous in an economical sense, as stated above.

SUMMARY OF THE INVENTION

The object of the present invention is to obviate such disadvantages and to provide a novel projecting device which can project a motion picture film at various speeds according to the requirements of the film.

Another object of the present invention is to provide a motion picture projecting device which synchronizes the sound accompanying the projection speed according to the varying requirements of the content of the film.

Other objects, features and advantages of the present invention will be made apparent from the following detailed description of the preferred embodiment thereof when reference is had to the accompanying drawings in which:

BRIEF DESCRIPTION OF THE DRAWINGS

FIG. 2 is a front view of an embodiment of the film used in connection with the projecting device of the present invention.

FIG. 3 is a block diagram showing the connection of the tape recorder connected with the projector in synchronized relation therewith so that the projection speed may be controlled by the tape.

FIG. 4 is a diagrammatic representation of the arrangement of the film and the projection speed controlling device in accordance with another embodiment of the invention.

FIG. 5 is a diagrammatic representation of the arrangement of the same in accordance with still another embodiment of the invention.

DESCRIPTION OF THE PREFERRED EMBODIMENTS

Figure 1:
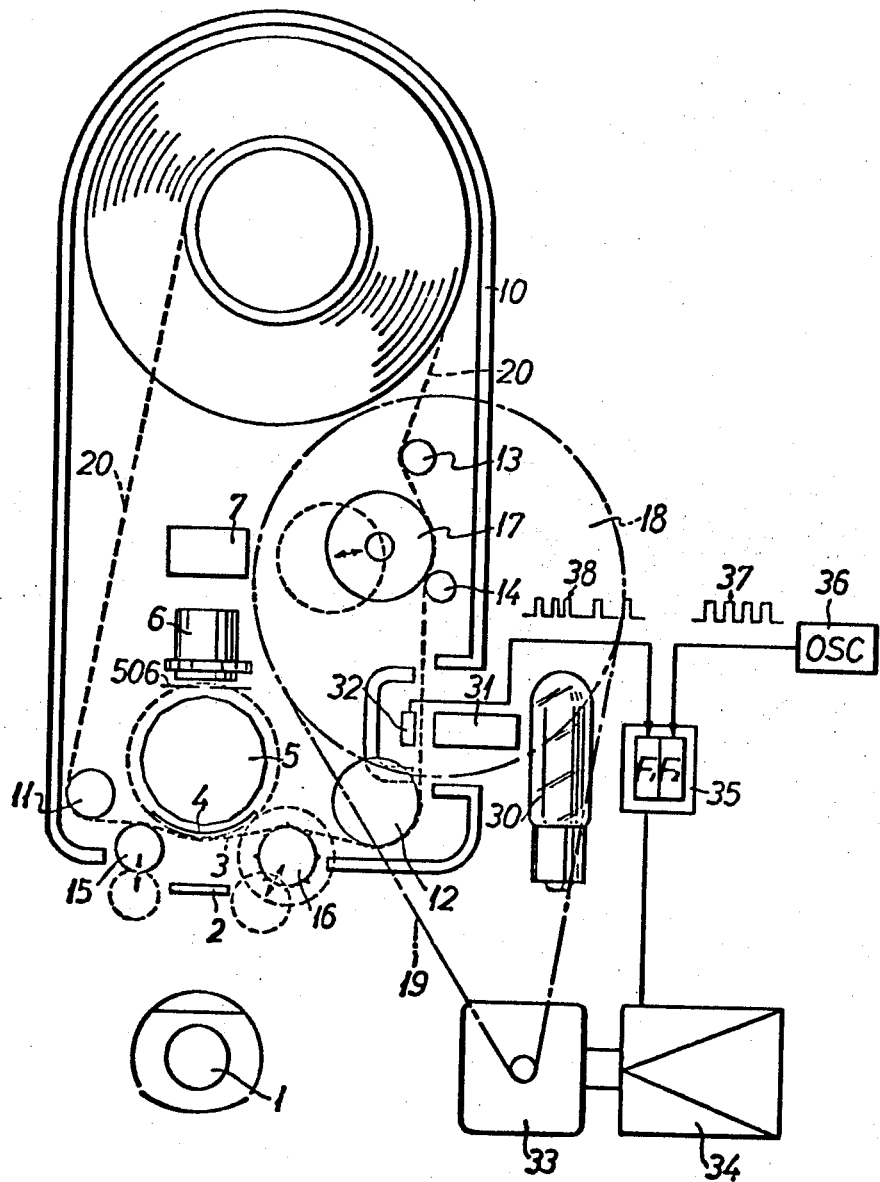
FIG. 1 is an explanatory plan view of an embodiment of the projecting device in accordance with the present invention.

Now referring to FIG. 1 showing an embodiment of the motion picture projector in accordance with the present invention, the projection light is emitted from the light source 1 and passes through a cooling filter 2, a motion picture film 3, an aperture 4, a polygonal prism 5 and a projection lens 6, then is reflected by a reflection mirror 7 and another mirror not shown, and is thereafter projected onto a transmission screen not shown in the drawing. The polygonal prism 5 is rotated about its axis in synchronism with the feeding of the film 3 and is located at such a position that the projection light passes through the center thereof. The aperture 4 has a width at least twice as large as the length of one frame of the film so that two or more frames of the motion picture film 3 may be projected on the screen at a time. Between the prism 5 and the projection lens 6 is provided a slit 506 for improving the quality of the projected image. The reference numeral 10 shows an endless film magazine, having a plurality of guide rollers 11, 12 and 13 disposed therein for guiding the film. A roller 15 is provided in the projector side and a sprocket wheel 16 is assocated with the polygonal prism 5 through a gear. A capstan 14 is coaxially mounted to a pulley 18 driven by a motor 33. The reference numeral 17 shows an idler roller which feeds the motion picture film 3 in cooperation with the capstan 14.

The sprocket wheel 16 is driven by the film in engagement with the perforations on the film 3. By the rotation of the sprocket wheel 16, the polygonal prism 5 associated therewith is rotated and the motion pictures are projected on the screen in accordance with the known theory of projection through the polygonal prism. An exciter lamp 30 gives light to a photoelectric converter element 32 through a condenser lens 31 and the film 3 so that the signal provided on the film may be sensed by the photoelectric element 32.

The electric motor 33 is driven by an amplifier 34 to rotate the capstan 14 through a belt 19 and pulley 18.

In the motion picture projector in accordance with the present invention as described above, a pulse generator 36 is incorporated for generating standard pulses 37 (18 pulses/sec in this embodiment) of equal intervals. The standard pulses 37 are memorized by a memory means 35 such as a flip-flop circuit. While the memory means 35 memorizes the pulse coming from the pulse generator 36 (hereinafter referred to as "memorizing condition"), the motor 33 is provided with electric circuit for increasing speed by the amplifier 34. The photoelectric convertor element 32 detects the signal carried by the film 3 and sends the received signal as a pulse 38 to the memory means 35 so that the memory means 35 may be changed to nonmemorizing condition from the memorizing condition and the current for increasing the speed is cut.

Referring now to FIG. 2, the speed signal provided on the film will be described in detail. A line of perforations 40 are provided on the film along one edge thereof, and 50, 51, 52 and 53 respectively indicate motion picture images formed on the film 3. On the side of the film 3 opposite the perforations 40 is provided an optical signal track 41 along the edge of the film on which speed signals 42 are recorded. The speed signal 42 comprises a number of pulse signals which correspond to the speed of the film to be fed. The greater the number of pulse signals, the slower the film speed becomes. That is, the interval between the adjacent signals is shorter where the film is to be fed slowly. The speed signal for the image frame 50 is recorded at 50'. Similarly, the speed signals for the image frames 51, 52, and 53 are recorded at 51', 52' and 53', as shown in FIG. 2. This is for the purpose of positioning the signal at the photoelectric detecting means 32 in FIG. 1 when the image corresponding to the signal is at the aperture 4.

In operation, if the film as described above is loaded in the projecting device as shown in FIG. 1, the speed of film feed it will be controlled in accordance with the number of pulses provided on the signal track 41. That is, in this embodiment, since the pulse generator 36 generates 18 pulses per second, the film is fed at the speed of 18 frames per second where one pulse signal is provided for one frame as shown at 50' and 51'. Where three pulse signals are provided for one frame as shown at 52' and 53', the film is fed at the speed of six (18/3) frames per second. The number of the signal pulses may not be integral numbers, but may be any number determined by the formula $Y = 18/X$ when the film is desired to be fed at the speed of $X$ frames per second. Thus, the film can be fed at any desired speed.

Further, it will be understood that the speed of feeding the film can also be varied by varying the intervals between the successively generated pulses from the pulse generator 36. In practice, the change of speed of the film feeding system can be made smoothly due to the mechanical inertia in the drive means.

The synchronizing system will now be described referring to the drawings. FIG. 3 shows an embodiment of the synchronizing means in which the pulse generator 36 employed in the embodiment of FIG. 1 is replaced by a tape reproducing device 39. In this embodiment, the speed of feeding the film 3 is controlled by the pulses recorded on the tapes 43 and reproduced through the magnetic reproducing head 39 instead of the pulse generator 36 in the first embodiment. Thus, the sound can be synchronized with the projected motion picture images. It will be readily understood that the pulse signals are recorded on the tape 43 at equal intervals of 18 pulses per second.

Although, in the above embodiments, the projecting speed is controlled by the pulses, the same result can be obtained by utilizing a sine wave instead of the pulses.

In another embodiment shown in FIG. 4, the signal track 41 provided on the film is in the form of a density variation means which varies the amount of light which is transmitted therethrough. In FIG. 4, the signal track 41 of the film is provided with signals for controlling the feed speed of the film. The signals 54, 55 and 56 are recorded on the film signal track for varying the amount of light transmitted therethrough. That is, the density is varied according to the speed to be controlled thereby. The reference numeral 32 shows a photoelectric element to receive the light from the light source transmitted through the film signal track 41. The photoelectric element converts the amount of light reaching the sensing element into electric signals and sends the signals to an amplifier 44. The signals are amplified by the amplifier 44 and conveyed into the drive motor 33 to control the speed of the motor and, in turn, the speed of projection.

In FIG. 5 is shown another embodiment of the projecting device of the subject invention which changes the speed of projection into two kinds of speeds, normal projection speed and slow-motion projection speed. There are two parts in the signal track 41 of the film 3b. One part is a portion 57 having no signal and the other is a portion 48 having a signal thereon. The photoelectric element 32 receives the light from a light source through the film signal track 41 and transmits the signal to the amplifier 44'. While the non-signal portion 57 passes by the photoelectric element 32, the photoelectric element 32 does not transmit a signal to operate the amplifier 44'. When the portion 58 having a signal thereon passes by the element 32 the amplifier 44' is operated by a signal from the element 32 to actuate a lever 47. The lever 47 is an actuating lever for operating a slow motion mechanism (not shown) and is connected with a solenoid 46 which is actuated by the amplifier 44'. Thus, when the signal portion 58 of the film signal track 41 comes into the position to be detected by the photoelectric element 32, the solenoid 46 is actuated to operate the slow motion lever 47 and brings the lever into the position shown by the dotted line 47' in FIG. 5. Thus, the film speed in the projector can be changed automatically to a slow motion projection speed condition form a normal projection speed condition.

Though there have been described several embodiments of the present invention, there are various other possible ways of controlling the speed of the film feed by signals provided on the film. For example, area types and density types of the optical recording system can be employed herein.

Furthermore, the signal track may not be an optical recording track, but may be a magnetic recording track, although each of the preferred embodiments described hereinabove have incorporated an optical recording track.

As will be readily understood from the above description, the motion picture projector of the type described hereinabove with respect to various embodiments of the present invention cannot be used with a film having a sound track of either the magnetic or optical recording type unless, the projector is provided with a means for turning off the speed control system in accordance with the present invention when a film having such a type of sound recording track is used. Thus, the projector can be used with both types of film by deactivating the film speed control system.

In accordance with the present invention, the projection speed of the motion picture projector can be controlled according to the requirements of the film projected, and accordingly, the length of the film required can be greatly reduced.

Still further, it will be understood that no special programming means are required for controlling the speed of the projection separately from the film or projector, since the motion picture film per se is used to control the speed.

What is claimed is:

1. A motion picture projecting device comprising means for detecting speed signals contained on a signal track provided on a film to be projected and projection speed control means operatively connected to said detecting means for automatically controlling the projection speed in response to the detected signals, wherein said speed signals comprise a plurality of pulse signals and said speed control means includes a standard pulse generating means and a pulse comparing means for comparing the standard pulses generated by said standard pulse generating means with the pulse signals detected by said detecting means to control the speed of projection.

2. A motion picture projecting device as claimed in claim 1 wherein said standard pulse generating means comprises a tape reproducing device for reproducing signals recorded on a recording tape.

3. A motion picture device comprising means for detecting speed signals contained on a signal track provided on a film to be projected and projection speed control means operatively connected to said detecting means for automatically controlling the projection speed in response to the detected signals, wherein said signal track comprises two parts, one part being a non-signal generating portion and the other part being a signal generating portion, whereby the speed of projection is changed into two speeds by detecting said two parts of said signal track.

4. A motion picture projecting device as defined in claim 3 wherein said detecting means is operatively connected with a solenoid, said solenoid being mechanically connected with a lever for operating a slow motion projection control on said projecting device.

5. A motion picture projecting device as defined in claim 1 wherein said pulse comparing means comprises a flip-flop circuit for receiving both said standard pulses and said pulse signals.

* * * * *